United States Patent [19]
Aquilina et al.

[11] 3,962,902
[45] June 15, 1976

[54] APPARATUS FOR MEASURING VARIATIONS IN FLOATABILITY OF A FLOAT DUE TO VARIATIONS IN PRESSURE

[75] Inventors: Robert R. Aquilina, Toulon; Robert A. Masson, Carqueiranne; Norbert A. Jerez, Toulon-Mourillon, all of France

[73] Assignee: Etat Francais, represented by Delegation Ministerielle pour l'Armement, France

[22] Filed: Sept. 15, 1975

[21] Appl. No.: 613,194

[30] Foreign Application Priority Data
Sept. 23, 1974 France .............................. 74.31947

[52] U.S. Cl. .................................. 73/37; 73/141 A; 73/170 A
[51] Int. Cl.² ......................................... G01N 9/08
[58] Field of Search ............... 73/37, 433, 434, 435, 73/436, 437, 309, 141 A, 170 A

[56] References Cited
UNITED STATES PATENTS

| | | | |
|---|---|---|---|
| 2,393,996 | 2/1946 | Layton | 73/37 |
| 2,574,475 | 11/1951 | Grogan | 73/37 |
| 2,826,629 | 3/1958 | Reuschle et al. | 73/309 |
| 3,695,103 | 10/1972 | Olson | 73/170 A |

*Primary Examiner*—Donald O. Woodiel
*Attorney, Agent, or Firm*—Stevens, Davis, Miller & Mosher

[57] ABSTRACT

A system for measuring variations in floatability or floatation force of a float under varying pressure conditions, including a liquid filled enclosure and means for varying the pressure therein, a dynamometric ring suspended in the enclosure with strain gauges located on each side of the ring, and means for suspending a test float and a ballast from the ring. The system may also include means for preventing inelastic deformation of the ring, and the strain gauges may be connected as adjacent arms of an electrical resistance bridge.

11 Claims, 2 Drawing Figures

APPARATUS FOR MEASURING VARIATIONS IN FLOATABILITY OF A FLOAT DUE TO VARIATIONS IN PRESSURE

The object of the present invention is an apparatus for measuring the variations in floatability of a body due to variations in hydrostatic pressure.

The technical field of the invention is the construction of floats for devices which are to be submerged at great depth.

For oceanographic studies, or in order to emit or pick up acoustic signals there are frequently employed apparatus submerged at great depths which are equipped both with floats and with a ballast so that after the separation of the ballast, the apparatus rises again to the surface to form a recoverable buoy.

The floats of these types of apparatus are generally formed of cellular materials of low density which can withstand high compressive stresses, for instance, they are formed of a material known as syntactic foam.

It is important to verify that the floatability, that is to say the force of ascent of the floats, retains a sufficient value when the pressure increases.

Generally the floatability decreases when the pressure increases as a result of the compressibility of the float. It may also decrease abnormally due to the absorption of water by the float.

It is important to know the law of variation of the floatability not only of the material but also of each float since this law also depends on the dimensions and shape of the float.

It is desirable to be able to measure this law of variation with great precision since the variation in floatability may be very small, namely of the order of a few grams.

The apparatus used to measure the variations in floatability comprise a liquid-filled enclosure within which the float is placed; means for varying the pressure of the liquid, and a balance to which the float and a noncompressible ballast are hooked and which measures the difference between the apparent weight of the ballast and the thrust due to the floatability of the float.

In the event that the balance is placed outside the liquid-filled enclosure it is therefore necessary to use a mechanical transmission of forces between the inside of the enclosure and the balance, assuring water-tightness at the passage of this transmission through the walls of the enclosure.

The friction due to the sealing devices does not make it possible to employ such a solution for the precise measurement of variations in floatability.

In accordance with another method, the balance is immersed in the liquid, generally sea water, when variations of floatability in the sea are to be studied. This solution presents difficulties. As a matter of fact it is necessary to produce a balance which withstands both contact with the sea water and very high pressures, on the order of 1,000 bars in certain cases.

It has been attempted to produce apparatus containing flexure balances or spring dynamometers equipped with strain gauges to measure the flexure. None of these solutions however has made it possible up to now to obtain apparatus which is sufficiently sensitive.

There are also known so-called dynamometric-ring balances which include a vertically suspended elastic ring to the lower part of which the weights to be measured are hooked. Such a ring deforms under the effect of the weights hooked to it. Strain gauges are arranged on the side walls of the ring which gauges deform at the same time as the ring and undergo a variation of electrical resistance which is transformed into an electric signal which is proportional to the weight attached.

Such balances have been used to measure large weights on the order of a newton, but have not been used up to now for the precise measurement of forces on the order of a gram. As a matter of fact, the dynamometric-rings used up to the present time are metal rings, machined to obtain a perfect circular form in the absence of stress. Such rings have a certain thickness and the deformations which they undergo remain very small as long as the forces which are applied to them do not exceed a relatively high threshold.

The object of the present invention is to provide an apparatus for measuring variations of floatability which is simultaneously very sensitive and very precise, which withstands very high pressures and which is insensitive to contact with sea water, and using a dynamometric ring adapted to this purpose.

An apparatus in accordance with the invention includes an enclosure which is resistant to very high pressures; which enclosure is filled with a liquid, and means for varying the pressure of said liquid.

The object of the invention is achieved by means of a dynamometric ring suspended on the inside of said enclosure, which ring is formed of a thin elastic blade whose two ends are connected, stress gauges being placed on the side faces thereof and the float, the variations of floatability of which it is desired to measure. Suspended from it is a noncompressible ballast which is hooked to said float. The thin blade is perferably a spring steel band having a thickness between 0.1 mm, and 1 mm, and a width between 1 cm and 5 cm.

The use of an elastic blade to form the dynamometric ring has the advantage that the blade may be adequately curved by bringing the two ends thereof together and connecting them by any known means to obtain a circular ring under the effect of the elastic forces. Such a ring can be formed of a band which is sufficiently wide to carry stress gauges of ordinary dimensions while being sufficiently thin in order that very small forces may bring about a substantial flattening of the ring and a deformation of the gauges thereby giving rise to a perceptible electric signal which naturally can be amplified.

The weight of the ballast which is hooked to the float is very slightly greater than the floatability of the immersed float under zero pressure so that from the very start of the measurement the total floatability of the assembly consisting of float plus ballast is negative, but in exceptional cases, it becomes more and more negative when the pressure increases.

The dynamometric ring of an apparatus in accordance with the invention is suspended preferably within a frame whose height is greater than the diameter of the ring at rest. This frame serves as a stop for the ring and prevents the limits of elastic deformation thereof from being exceeded.

The strain gauges are preferably placed at the two ends of the horizontal diameter of the ring where the deformations along the tangential direction are the greatest. They are placed opposite each other on each face of the ring so that the two diametrically opposite gauges placed on the inner face are in tension when the other two are in compression, or vice versa. Each pair of gauges which undergoes deformations in the same direction constitutes two opposite branches of a Wheatstone bridge so that the effects of the variations in resistance due to the deformations add to each other while the variations of temperature or pressure substract from, and compensate for, each other.

The strain gauges are covered with a film of resin which protects them from contact with the liquid, without modifying their sensitivity.

The result of the invention is a new apparatus for measuring the variations of floatability of floats as a function of the variations in pressure.

This apparatus makes it possible to measure these variations in the form of an electrical signal which can be recorded either by analog or digital recording. It makes it possible to measure small variations of between 0 and 2 newtons with a precision of the order of 0.01 N, and variations of between 0 and 15 newtons with a precision of the order of 0.05 N.

The following description refers to the accompanying drawings which show, by way of example, one embodiment of the invention, without limitation.

FIG. 1 shows a water-tight caisson 1 which can withstand very high pressures of up to 1,200 bars.

Figure 1:
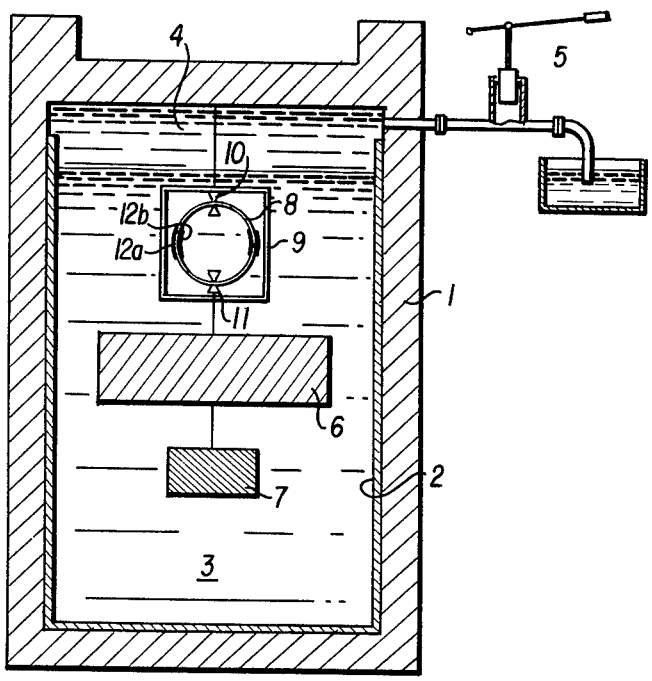
FIG. 1 is an elevation of an apparatus in accordance with the invention intended to measure variations of floatability in sea water.

Within this caisson there is placed a tank 2 open at its top and filled with sea water 3. The rest of the caisson 1 is filled with a liquid 4, which is immiscible with water, for example a mineral oil, and the apparatus comprises a pump 5 which makes it possible to vary the pressure of the liquid.

Within the tank 2 there is placed a float 6, for instance a float of syntactic foam, the variations in floatability of which it is desired to measure as a function of the variations in hydrostatic pressure of the sea water in which it is immersed.

To the float 6 there is hooked a ballast 7 of metal or any other practically noncompressible material. The apparent weight of the ballast, with due consideration of the hydrostatic thrust, is very slightly greater than the floatability of the float 6 when the latter is slightly immersed in sea water, that is to say when it is immersed under a hydrostatic pressure equal to atmospheric pressure.

The apparatus comprises a dynamometric ring 8 suspended within a frame 9 and submerged in the sea water.

The assembly formed by the float 6 and the ballast 7 is fastened to the lowest point of the ring 8. The ring 8 is formed of a thin blade of spring steel the two ends of which are brought together and connected by any means, for instance by rivets. In the absence of any external force applied to the ring, the ring assumes the shape of a circle under the effect of the elastic forces.

The ring 8 is placed on a linear support in the form of a knife edge 10 fastened to the upper cross member of the frame 9. The load formed by the float 6 and the ballast 7 is fastened to a knife edge 11 which rests on the lower generatrix of the ring 8.

As the load increases, the ring 8 deforms, flattening out. The height of the frame 9 is greater than the diameter of the ring 8 at rest and is determined in such a manner that the ring comes against the frame before permanent deformation of the ring commences.

At the two ends of the horizontal diameter of the ring, strain gauges 12 are arranged vertically in order to measure the deformations of the ring.

At each of the ends of the said horizontal diameter there are preferably arranged opposite each other two identical strain gauges, one 12a on the outer face and the other 12b on the inner face. When the ring lengthens, the length of the outer gauges 12a decreases while the length of the inner gauges 12b increases. The gauges 12a and 12b are connected electrically in a differential circuit so that the signals of opposite sign which they emit add on to each other. For example they are mounted in two adjacent branches of a resistance bridge of the Wheatstone-bridge type, the assembly consisting of the four gauges constituting a complete bridge. This differential circuit makes it possible to eliminate the influence of the variations in temperature which result in identical variations in signal on the two gauges 12a and 12b.

Figure 2:
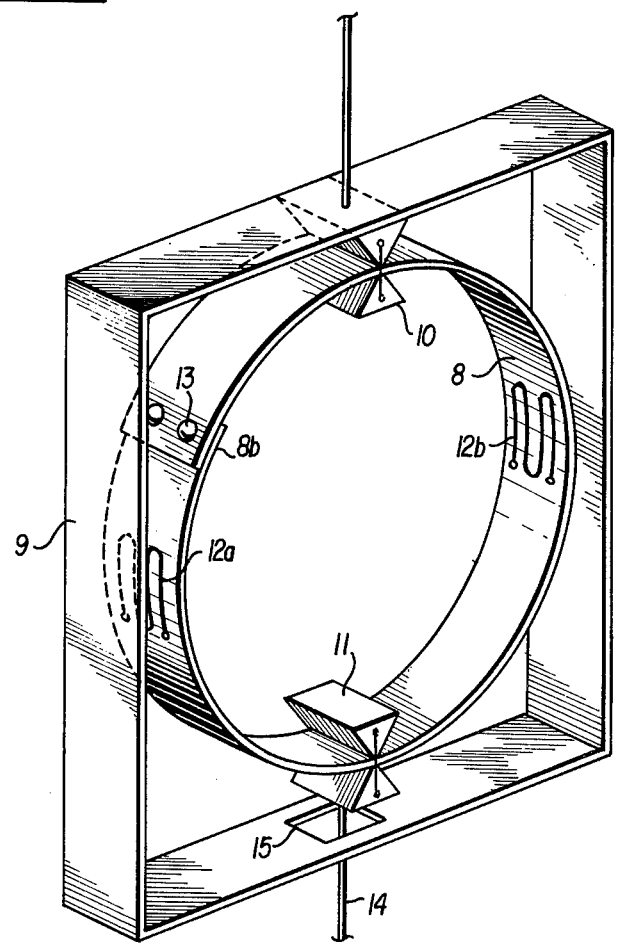
FIG. 2 is a perspective view of the dynamometric ring.

FIG. 2 shows, in perspective, the ring 8 resting on the knife edge support 10 which is fastened to the frame 9. In this figure there can be noted the knife edge 11 placed on the lower generatrix of the ring 8 to which there is attached a rod 14 from which the load is suspended. This rod passes freely through an opening 15 cut at in the lower cross member of the frame. In this figure one can also note the two ends 8a and 8b of the blade forming the ring 8, which ends are superposed and connected by rivets 13. An outer gauge 12a and an inner gauge 12b can be noted.

The gauges used are resistance gauges with a thin network of a current model, the dimensions of which are selected as a function of the width of the ring.

Of course the signal supplied by the resistance bridge is then amplified and can be registered by analog or digital recording. The gauges 12 are covered with a layer of resin which protects them from contact with the sea water.

By way of example, an apparatus having a dynamometric ring of a diameter at rest of 200 mm, formed of a strip of elastic steel having a width of 45 mm and a thickness of 0.3 mm makes it possible to measure variations of floatability of between 0 and 2 N with a precision of the order of 0.01 N.

An apparatus comprising a dynamometric ring having a diameter of 200 mm formed of a strip of elastic steel having a width of 35 mm and a thickness of 0.5 mm makes it possible to measure variations of floatability of between 0 and 15 N with a precision of the order of 0.05 N.

Of course, without going beyond the scope of the invention, various parts of the apparatus which have been described by way of example can be replaced by equivalent parts which are well-known to those skilled in the art.

What is claimed is:

1. An apparatus for measuring variations in floatability of a float with variations in pressure, comprising:
    an enclosure which is resistant to high pressures and which is filled with liquid,
    means for varying the pressure of said liquid within said enclosure,
    a dynamometric ring suspended within said enclosure, said ring comprising a thin elastic blade whose two ends are connected to each other,
    strain gauges located substantially vertically on the side faces of the ring,
    means for suspending a float from said ring, and noncompressible ballast and means for suspending said ballast from a float suspended from said ring.

2. The apparatus of claim 1, additionally comprising a float suspended from said ring, said ballast being suspended from said float.

3. The apparatus of claim 1 wherein said dynamometric ring is a spring steel band.

4. The apparatus of claim 3, wherein said band is of a thickness of about 0.1 to 1 mm., and of a width of about 1 to 5 cm.

5. The apparatus of claim 4 wherein said band is of a thickness of about 0.3 to 0.5 mm, and of a width of about 3 to 5 cm.

6. The apparatus of claim 2, wherein the apparent weight of said ballast, submerged in said liquid is slightly greater than the force of floatation of said float when it is slightly immersed in said liquid.

7. The apparatus of claim 1, additionally comprising means for preventing said ring from inelastically deforming.

8. The apparatus of claim 1, additionally comprising an open frame in which said ring is suspended, the height of said frame being greater than the vertical diameter of said ring at rest, and being less than a vertical diameter at which said ring would inelastically deform, said frame thereby comprising a stop for preventing said ring from inelastically deforming.

9. The apparatus of claim 1, wherein two substantially identical strain gauges are located at each of the ends of the horizontal diameter of said ring on the two opposite faces of said ring, and said gauges are electrically connected as two adjacent arms of a resistance bridge.

10. The apparatus of claim 1, wherein said strain gauges are covered with a coating which protects said gauges from said liquid.

11. The apparatus of claim 2 for measuring variations of floatability in sea water, wherein said enclosure is located a tank open at its top and filled with sea water in which said ring, float and ballast are immersed, the open top of said tank being filled with oil which fills the remainder of said enclosure, and means for pressurizing liquids, which means is in communication with said oil.

* * * * *